US010233957B2

(12) United States Patent
Hettich

(10) Patent No.: US 10,233,957 B2
(45) Date of Patent: Mar. 19, 2019

(54) COIL FOR A THREADED INSERT

(71) Applicant: Ludwig Hettich Holding GmbH & Co KG, Schramberg (DE)

(72) Inventor: Ulrich Hettich, Schramberg (DE)

(73) Assignee: LUDWIG HETTICH HOLDING GMBH & CO KG, Schramberg (DE)

( * ) Notice: Subject to any disclaimer, the term of this patent is extended or adjusted under 35 U.S.C. 154(b) by 188 days.

(21) Appl. No.: 15/021,396

(22) PCT Filed: Aug. 6, 2014

(86) PCT No.: PCT/EP2014/066899
§ 371 (c)(1),
(2) Date: Mar. 11, 2016

(87) PCT Pub. No.: WO2015/036182
PCT Pub. Date: Mar. 19, 2015

(65) Prior Publication Data
US 2016/0223006 A1    Aug. 4, 2016

(30) Foreign Application Priority Data

Sep. 11, 2013    (DE) .................. 10 2013 109 987

(51) Int. Cl.
*F16B 25/00*    (2006.01)
*F16B 37/12*    (2006.01)
*F16B 33/00*    (2006.01)

(52) U.S. Cl.
CPC ........ *F16B 25/0005* (2013.01); *F16B 37/127* (2013.01); *F16B 33/006* (2013.01)

(58) Field of Classification Search
CPC .............. F16B 25/0052; F16B 25/0026; F16B 25/0005
(Continued)

(56) References Cited

U.S. PATENT DOCUMENTS 240,780 A * 4/1881 Smith .................... F16H 55/22
411/438
2,390,514 A * 12/1945 Cram ..................... F16B 37/12
403/DIG. 3
(Continued)

FOREIGN PATENT DOCUMENTS

DE    1216027    5/1966
DE    19841135    4/1999
(Continued)

OTHER PUBLICATIONS

International Search Report and Written Opinion for PCT/EP2014/066899, dated Nov. 12, 2014 (13 pages).
(Continued)

*Primary Examiner* — Flemming Saether
(74) *Attorney, Agent, or Firm* — Patent Law Works LLP

(57) ABSTRACT

The present invention relates to a coil (10) for transmitting torque to a threaded insert sleeve with an external thread and/or for tapping a thread. The coil (10) comprises a radially outer profile for anchoring the coil (10) in a threaded insert sleeve and for transmitting a torque to the threaded insert sleeve and/or for tapping a thread. In addition, the coil (10) comprises a driving profile suitable for receiving a drive, which can engage in the driving profile in such a way that a torque can be transmitted from the drive to said coil (10) and that at the same time the drive limits or avoids any torsion of the coil (10).

24 Claims, 13 Drawing Sheets

(58) Field of Classification Search
USPC ............. 411/386, 383, 386.4, 424, 903
See application file for complete search history.

(56) References Cited

U.S. PATENT DOCUMENTS

| | | | | |
|---|---|---|---|---|
| 2,993,950 | A * | 7/1961 | Forman | ............. F16B 25/0094 |
| | | | | 174/138 D |
| 3,086,072 | A * | 4/1963 | Forman | |
| 5,312,214 | A * | 5/1994 | Morton | ................. F16B 37/12 |
| | | | | 411/17 |
| 5,961,266 | A | 10/1999 | Tseng | |
| 8,105,004 | B2 * | 1/2012 | Stephen | ............... F16B 33/006 |
| | | | | 411/377 |
| 8,430,617 | B2 | 4/2013 | Hettich et al. | |
| 2010/0290858 | A1 | 11/2010 | Hettich et al. | |
| 2010/0316466 | A1 | 12/2010 | Hettich et al. | |
| 2011/0142569 | A1 * | 6/2011 | Hagel | |

FOREIGN PATENT DOCUMENTS

| | | |
|---|---|---|
| DE | 69903394 T2 | 10/2003 |
| DE | 102006003172 A1 | 7/2007 |
| DE | 102007054798 B3 | 4/2009 |
| WO | 8200505 A1 | 2/1982 |
| WO | 2009033637 A2 | 3/2009 |
| WO | 2011063138 A1 | 5/2011 |

OTHER PUBLICATIONS

English translation of the International Preliminary Report on Patentability and Written Opinion for PCT/EP2014/066899, dated Mar. 24, 2016 (21 pages).

* cited by examiner

COIL FOR A THREADED INSERT

CROSS REFERENCE TO RELATED APPLICATIONS

This application is a National Stage of International Application No. PCT/EP2014/066899filed Aug. 6, 2014, entitled "WENDEL FÜR EINEN GEWINDEEINSATZ", which claims priority to German Application 10 2013109 987.4 file Sep. 11, 2013, all of which are hereby incorporated by reference in their entirety.

FIELD OF THE INVENTION

The present invention is in the field of anchoring technology and comprises a coil for transmitting torque to a threaded insert sleeve and/or for tapping a thread, a bolt suitable for use with said coil, a threaded insert with said coil and a method of producing said coil.

BACKGROUND

Threaded inserts are used for joining different components, where the components can consist of the same or different materials. Examples are steel/plastic, plastic/plastic, steel/steel, steel/aluminium, aluminium/aluminium, steel/wood, wood/wood and wood/concrete joints. Threaded inserts with a self-tapping external thread for screwing into brickwork or concrete are of particular practical importance.

Threaded inserts usually have an internal thread and an external thread. In order to create a joint by means of a threaded insert, the threaded insert is screwed via its external thread into a hole drilled into the component to be joined or into the material. The connection to another component can then be made with a connecting bolt by screwing the connecting bolt into the threaded insert.

Threaded inserts can already be introduced into the component to be joined during the process of manufacturing the component, or they can also be introduced into the component subsequently, e.g. for repair purposes.

A threaded insert comprising an internal thread and an external thread and made from a solid workpiece is described in EP 1 085 220 B1.

Another threaded insert, which likewise has an internal and an external thread, but is wound from a profiled strip, is known from DE 10 2007 054 798 B3. Compared to other threaded inserts, that wound threaded insert has the advantage that it is less expensive to manufacture, because less material and production effort are required.

One disadvantage of the wound threaded insert is, however, that it is not ideally suitable for tapping a thread. That is due firstly to the fact that the necessary drive torque cannot easily be transmitted via the wound profiled strip to a leading part of the threaded insert, at which the thread is to be tapped, without the profiled strip helix becoming warped. Secondly, the thread material must have a certain hardness for the purpose of tapping. It is, however, usually the case that hardening also increases the brittleness of the material. The profiled strip must not be too brittle, though, because on the one hand the forming capacity of the material is then limited, and on the other hand because the product characteristics require ductile behaviour on the part of the material. Furthermore, the transmission of torque via a profiled strip which is too brittle and which has only been hardened after winding, is critical, because this can likewise cause the profiled strip to fracture.

A further disadvantage of using a hardenable material for a profiled strip of a wound threaded insert is that materials of this kind are not very resistant to corrosion.

The present disclosed technology is based on the objective of solving the problems described above.

SUMMARY OF THE INVENTION

This problem is solved by the subject matter of the independent claims. Advantageous further developments and embodiments are described in the dependent claims.

The present disclosed technology comprises a coil for transmitting a torque to a threaded insert sleeve with an external thread and/or for tapping a thread. The coil comprises a radially outer profile, which is provided for anchoring the coil in a threaded insert sleeve and for transmitting a torque to the threaded insert sleeve. In addition or alternatively, the outer profile can also be intended for tapping a thread. Furthermore, the coil comprises a driving profile suitable for receiving a drive, which can engage in the driving profile in such a way that a torque can be transmitted from the drive to the coil and at the same time any torsion of the coil is limited or avoided.

In known threaded inserts with a threaded insert sleeve, for screwing into a drilled hole, the torque is usually applied at a rear end of the threaded insert and transmitted to the external thread via the threaded insert sleeve.

In contrast to that type, the torque can be transmitted directly to the threaded insert sleeve in the region of the leading end by means of the coil of the disclosed technology, which can be anchored in the region of the leading end of the threaded insert sleeve. The transmission of torque can be achieved by means of a driving tool which can engage with a suitable drive in the driving profile—passing through the threaded insert sleeve—and can transmit the torque to the threaded insert sleeve via the coil, e.g. by turning about a longitudinal axis.

Since the drive engages in the driving profile of the coil, the shape of the coil can be stabilised, so that the coil does not undergo any torsion when the torque is transmitted. As a result, during transmission of torque, that portion of the threaded insert sleeve in which the coil is anchored also remains stable in shape, so that that portion of the threaded insert sleeve likewise does not undergo any torsion.

This is particularly advantageous in the case of threaded insert sleeves which are not sufficiently rotationally stable or torsionally stable to transmit great torque over their length, for example because of too low a modulus of rigidity or too great a brittleness. The reason for this is that the torque can be transmitted directly—i.e. not along the length of the threaded insert sleeve—to a leading portion of the threaded insert sleeve, on which the resistance for the external thread to overcome when tapping is greater than on a subsequent portion of comparable length and that the driven portion of the threaded insert sleeve is stabilised by the coil, which for its part is stabilised against torsion by the driving tool.

Via its radially outer profile, the coil can not only be anchored in the threaded insert sleeve and have the torque transmitted to it, but can optionally in addition also tap a thread for the following external thread of the threaded insert sleeve in the drilled hole into which the threaded insert sleeve is simultaneously screwed in or "drawn in" via the coil.

As a result, by using the coil, it is also possible to use types of threaded insert sleeves for anchoring which it would not be possible to use without the coil, because they cannot be inserted into a drilled hole by transmitting torque in the region of their rear ends. In particular, inexpensive wound threaded insert sleeves can be used, which have only limited torsional stability, and which may furthermore be unhardened and corrosion-resistant, because the thread can be tapped by the outer profile of the coil.

In connection with a bolt, it is described further down that the coil can also be used solely for tapping the thread—i.e. not additionally for introducing torque into the leading end of a sleeve.

In one example, the coil is formed from a strip of material which runs helically about a longitudinal axis. This means that relatively little material is needed to produce the coil, and inexpensive production is possible. In order reliably to transmit the torque to a threaded insert sleeve and to enable reliable thread tapping, the length of the strip of material preferably corresponds to at least the length of one coil turn and is particularly preferably longer than the length of one coil turn.

The driving profile may comprise a plurality of recesses, with at least two recesses being spaced apart from one another along the strip of material by the length of one coil turn, so that those recesses are aligned along the longitudinal axis. In this way, a suitable drive can be received along the longitudinal axis and can engage in the aligned recesses, as a result of which a torque can be transmitted to the coil and the coil is simultaneously stabilised or "locked" against warping.

In order further to improve the transmission of torque to a threaded insert sleeve, its stabilisation and the anchoring of the coil in the threaded insert sleeve, and also to facilitate thread tapping, the coil may also comprise at least two coil turns. In this context, the driving profile preferably comprises a plurality of pairs of recesses, each pair of recesses being spaced apart from one another by the length of one coil turn and being aligned along the longitudinal axis. In this way, a drive which is received along the longitudinal axis of the coil can engage in a plurality of pairs of recesses, as a result of which torque can be transmitted to the coil in more than one position over a longer region.

The radially outer profile of the coil can comprise a plurality of outer projections, such as cutting or tapping teeth which are well suited to tapping. The radially outer projections are arranged spaced apart from one another along the strip of material and on the outer side of the coil, from where they extend radially outwards. Since these projections extend radially outwards, they can transmit torque to the threaded insert sleeve perpendicularly to that direction—i.e. in the circumferential direction.

In one example, the coil is at least partially made from a hardenable metal. Since a hardened metal is not so easy to form or work, the coil can first be given the intended shape during manufacture and then hardened. A high level of hardness is beneficial for tapping a thread. Since the coil is stabilised by a drive during tapping and because torsion of the coil is avoided, there is no or at least little risk of the coil's breaking, even if the coil is very brittle.

In one example, the coil is formed from a hardened metal which has a hard-ness of ≥58 HRC, preferably ≥63 HRC and particularly preferably ≥67 HRC. The unit HRC refers to the Rockwell hardness according to ISO 6508-1 (1997). A steel coil can be hardened by, for example, increasing the carbon content in the steel.

In another example advantageous embodiment, the coil is formed from a bimetal comprising a heat-treatable steel and a high-speed steel. The combination of materials has the advantage that with suitable heat treatment of the materials together, the heat-treatable steel has a tough yet still formable heat treatment microstructure, whereas the high-speed steel still possesses a very high level of hardness and wear resistance. A heat-treatable steel is therefore better formable and bendable compared to the high-speed steel, whereas the harder high-speed steel is better suited to thread tapping. The carbon content of a heat-treatable steel can, for example, be between 0.2 and 0.7%, and the carbon content of a high-speed steel can be increased to more than 2%. The bent coil region and the driving profile of the coil are preferably at least partially formed from heat-treatable steel and the radially outer profile at least partially from high-speed steel. The bent coil region means that region of the coil which lies between the radially outer profile and the driving profile. It should be noted that in the present description, a "bimetal" does not just mean metals with only two components, but can also refer to metals consisting of more than two components.

In the coil of the disclosed technology, the diameter of the envelope of the radially outer profile along a portion of the coil adjacent to a leading end of the coil can become smaller towards the leading end of the coil. As a result, it is easier to position the coil in a drilled hole, and thread tapping is facilitated. The portion mentioned is preferably at least the length of half a coil turn, and particularly preferably at least the length of a whole coil turn.

The driving profile may have the shape of a hexalobular socket, a polylobular socket or a polygonal socket, so that the coil can receive conventional drive geometries and be driven by them.

The present disclosed technology also comprises a threaded insert comprising a coil and a threaded insert sleeve. The threaded insert sleeve comprises an external thread with which the threaded insert can be screwed into a drilled hole. The coil is connected to the threaded insert sleeve in a positive fit via its radially outer profile, so that a torque transmitted to the coil via the driving profile is transmitted to the threaded insert sleeve. The coil is disposed at least partially in the leading half and preferably at the leading end of the threaded insert sleeve, so that the torque is transmitted to the threaded insert sleeve at least partially in the leading half and preferably at the leading end of the threaded insert sleeve.

An anchoring bolt can preferably be anchored in the threaded insert sleeve, for example by being screwed into an internal thread provided in the threaded insert sleeve. Because the threaded insert of the disclosed technology does not necessarily have to be driven via its rear end, but can also be driven via its leading end, it is possible in effect to "draw" the threaded insert into the drilled hole via its driven leading portion. In the driven leading portion, a thread for the following unstabilised portion of the threaded insert sleeve can be tapped into a drilled hole via the outer profile of the coil and/or via the driven portion the threaded insert sleeve, which is stabilised by the coil and is held "in splints" as it were.

The threaded insert of the disclosed technology offers the advantage that inexpensive and corrosion-resistant threaded insert sleeves can be used for it, which can be produced from comparatively little material and which it becomes easier to screw in—or even possible at all—thanks to the coil.

The radially outer profile of the coil, which transmits the torque to the threaded insert sleeve, can pierce the threaded insert sleeve and form portions of the external thread. With these portions of the external thread formed by the coil a thread can be tapped, into which the following external thread of the threaded insert sleeve is drawn when the threaded insert is screwed in and with which it engages.

In the threaded insert of the disclosed technology, the positive-fit connection between the coil and the threaded insert sleeve can also be a force fit and/or cohesive joint.

The threaded insert sleeve and the coil do not necessarily need to be made of the same material, but can also be formed at least partially from different materials. The threaded insert sleeve may, for example, be formed from a corrosion-resistant material, especially stainless steel. Corrosion-resistant materials are usually difficult to harden, so that such materials are not suitable for tapping a thread. Because of the combination with a hardened coil, the threaded insert can be screwed into a drilled hole in a self-tapping manner, without the threaded insert sleeve itself having to be suitable for tapping, and the threaded insert sleeve can in particular also be corrosion-resistant. As a result, with the aid of the threaded insert, it is possible to provide reliable and inexpensive long-term anchoring of an anchoring bolt without additional corrosion protection, for example by sealing the drilled hole or the like. The threaded insert sleeve may, however, also consist at least partially, preferably mainly, of plastic.

In one example, the threaded insert sleeve comprises a wound profiled strip, which is preformed on one side with the profile of the external thread and on the other side with the profile of an internal thread. A threaded insert of this kind with a coil and a wound profiled strip firstly requires little material to produce and can also be manufactured with comparatively little production effort. With a threaded insert of this kind, the coil can tap a thread for the wound profiled strip into the drilled hole and draw the external thread of the wound profiled strip after it and into the tapped thread via the leading end of the threaded insert. In this way it becomes considerably easier—or even possible at all—to insert a wound threaded insert sleeve made from a profiled strip into an unthreaded drilled hole.

In one advantageous further development of this threaded insert, the pitch of the coil corresponds at least approximately to the winding pitch of the profiled strip. As a result, the torque is transmitted at least partially along the profiled strip and screwing in becomes easier. The winding pitch of the profiled strip preferably also corresponds at least approximately to the pitch of the external thread, so that the torque is additionally transmitted at least partially along the profile of the external thread, as a result of which drawing in can be made even easier.

In an advantageous further development, the threaded insert sleeve has a head portion which projects radially beyond the rest of the threaded insert sleeve. With the aid of the head portion, the threaded insert can, for example, be used to fix certain components to other components, such as slabs of insulating material to a concrete wall or concrete ceiling. It should be noted that the term "threaded insert" in the context of the present disclosure is not intended to suggest that it is supposed to be inserted over its entire length into a substrate, such as concrete.

In another example, the threaded insert sleeve comprises a plastic sleeve or is formed by a plastic sleeve, it being possible for the coil to be encapsulated with the plastic of the threaded insert sleeve. To anchor an anchoring bolt in the plastic threaded insert sleeve, the threaded insert sleeve can comprise an internal thread, into which the anchoring bolt is screwed. Alternatively, the threaded insert sleeve can also have an unthreaded inner wall, especially a smooth inner wall, so that an anchoring bolt can tap a thread into the threaded insert sleeve in order to be anchored in the threaded insert sleeve.

This kind of threaded insert sleeve of plastic can then be screwed in with the aid of a tool which is inserted through a cavity in the sleeve and is received by the driving profile of the coil.

As an alternative to this, however, in an advantageous further development, a drive element is permanently disposed in the threaded insert sleeve. The drive element in this case has a first profile in a region near a leading end, which is engaged with the driving profile of the coil, and a second profile in a region near a rear end, which can be brought into engagement with a driving tool. The second profile can be surrounded by plastic, and in particular encapsulated in plastic.

An example with a drive element permanently disposed in the threaded insert sleeve has the advantage that, among other things, assembly is facilitated and that the threaded insert then no longer has to be accessible for a tool from the outside.

A drive element permanently disposed in the threaded insert sleeve can consist mainly of a metallic material, which allows the transmission of torque to the coil and also gives the plastic sleeve increased tensile strength. Putting it figuratively, a drive element of this kind can "reinforce" the plastic sleeve.

On the other hand, a metallic drive element of this kind has the disadvantage that because of the cost of the material, it can exceed the cost of the threaded insert, especially in the case of lengthy threaded inserts, which can be 20, 30 or even 40 cm or more and can be used, for example, to fix on-roof insulation or the like. In an advantageous further development, the drive element therefore consists of a reinforced plastic, especially a plastic reinforced with short or long fibres. The fibres here may be formed in particular from carbon fibres or glass fibres. Thanks to the reinforcement, the plastic achieves a strength which will be sufficient for many applications.

In one example, the second profile protrudes above the head portion. In this way, it is easy to engage the second profile with a driving tool. A second profile protruding above the head portion in this way may, however, be disturbing from the practical or also aesthetic point of view. In an alternative example, the head portion therefore has a recess in which the second profile of the drive element is disposed. The recess in this context is preferably so big that it allows the second profile to be brought into engagement with a driving tool. This will be explained in more detail below.

The present disclosed technology also comprises a bolt with a thread portion, which comprises a thread with a thread external diameter, and with a drive portion to be received by the driving profile of a coil in accordance with one of the examples described above. The drive portion of the bolt is located closer to a leading end of the bolt than the thread portion and comprises at least one drive means projecting radially outwards, which is suitable for engaging in the driving profile of the coil.

A bolt of this kind can be used with the coil of the disclosed technology in such a way that the coil receives the drive portion of the bolt and the bolt transmits torque to the coil via the drive portion. The coil can thus be used, when inserting the bolt into a drilled hole, for tapping a thread into which the bolt thread can be screwed. As a result, a material can be selected for the bolt which does not necessarily need to be suitable for tapping a thread and can be corrosion-resistant. In particular, the bolt can be made from stainless steel.

It should be noted that suitability for tapping as used in the present description does not refer to a fixed, absolute property of a material or apparatus, but rather to a property which can also be dependent on the nature of the material into which the drilled hole is made and on the geometry of the drilled hole.

In the bolt, the external thread diameter of the thread is preferably greater than the diameter of the envelope of the drive portion. The difference can be bridged by the coil of the disclosed technology when the latter receives the drive portion of the bolt, so that the tapped thread has an external diameter which is at least not substantially greater than the external thread diameter of the bolt thread.

In a further development of the bolt of the disclosed technology, the bolt also comprises a coil in accordance with the disclosed technology, the drive portion being connected to the coil by a force fit and the pitch of the coil corresponding at least approximately to the thread pitch on the thread portion. The radially outer profile of the coil is at least in some portions superimposed with an imaginary continuation of the thread of the bolt, in the direction of the leading end of the bolt.

In a further example, the disclosed technology comprises a bolt with a head configured as a force contact point and a shaft portion on which a thread is formed, the bolt being configured as an injection-moulded part, especially a plastic injection-moulded part. In the region of its leading end, the bolt has a coil, which has a radially outer profile that is configured for tapping a thread. In this case, the coil is encapsulated by the material of the shaft of the bolt in such a way that the radially outer profile protrudes at least in some portions radially beyond the shaft portion and is disposed on an imaginary periodical continuation of the thread of the bolt.

The coil here can possess all the above-mentioned features individually or in combination. Since, however, the coil is injected into the bolt and the bolt has a head configured as a force contact point, it is not necessary in this example for the coil to have a driving profile for receiving a drive.

Finally, the present disclosed technology comprises a method of producing a coil in accordance with one of the above-mentioned examples. The method comprises providing a strip of material with a first lateral surface and a second lateral surface opposite it, the first lateral surface having a plurality of recesses and the second lateral surface having a plurality of projections, wherein the recesses and/or the projections are introduced into the strip of material with the rake of a coil pitch to be wound. In addition, the method comprises winding into a coil the strip of material provided with the coil pitch to be wound.

As a result of the fact that the recesses and/or projections are introduced into the strip of material with the rake of the coil pitch to be wound, the recesses and/or the projections in the wound coil run parallel to a longitudinal axis or an imaginary coil axis about which the wound strip of material runs.

In this way, the lateral surface in the region of the recesses can rest evenly on a drive or driving tool which is introduced into the coil along the longitudinal axis of the coil. In addition, it means that in the wound strip of material, the projections or tapping teeth run parallel to the longitudinal axis in the longitudinal direction, so that tapping edges or surfaces tap evenly into the inner wall of the drilled hole during tapping.

BRIEF DESCRIPTION OF THE FIGURES

In the following description, the disclosed technology will be explained in more detail by referring to preferred embodiments, by way of example, reference being made to the enclosed drawings, in which.

In the following description, the same reference numerals are used for the same elements.

DETAILED DESCRIPTION OF PREFERRED EMBODIMENTS

Figure 1:
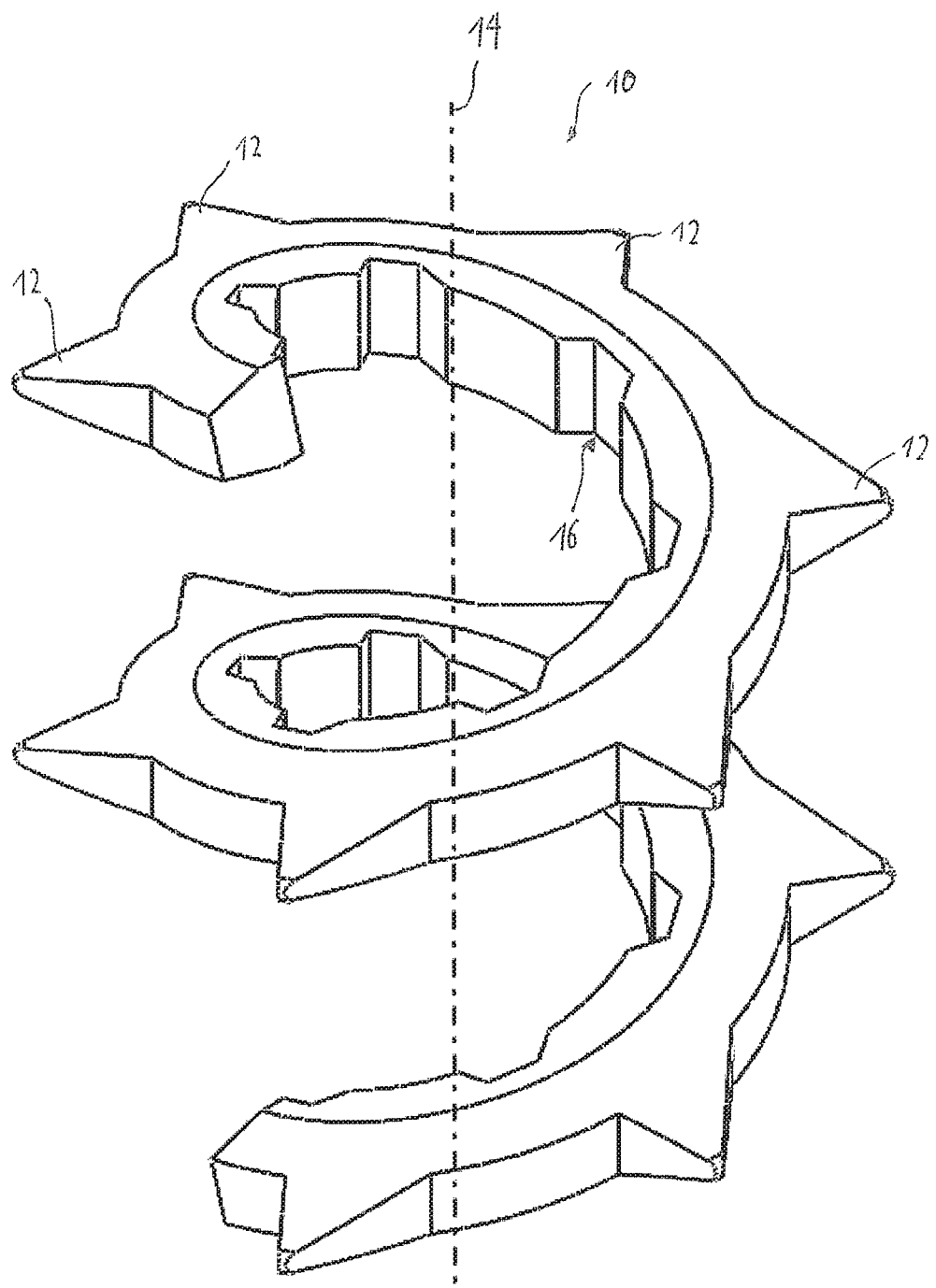
FIG. 1 shows a perspective view of a coil.

FIG. 1 shows a perspective view of a coil 10. The coil 10 comprises a radially outer profile, which has a plurality of radially outer projections 12. The coil 10 runs about an imaginary longitudinal or coil axis 14 and has a driving profile which comprises a plurality of recesses 16. The coil 10 shown in FIG. 1 comprises two thread turns, the driving profile containing six recesses 16 on the length of one coil turn.

Figure 2:
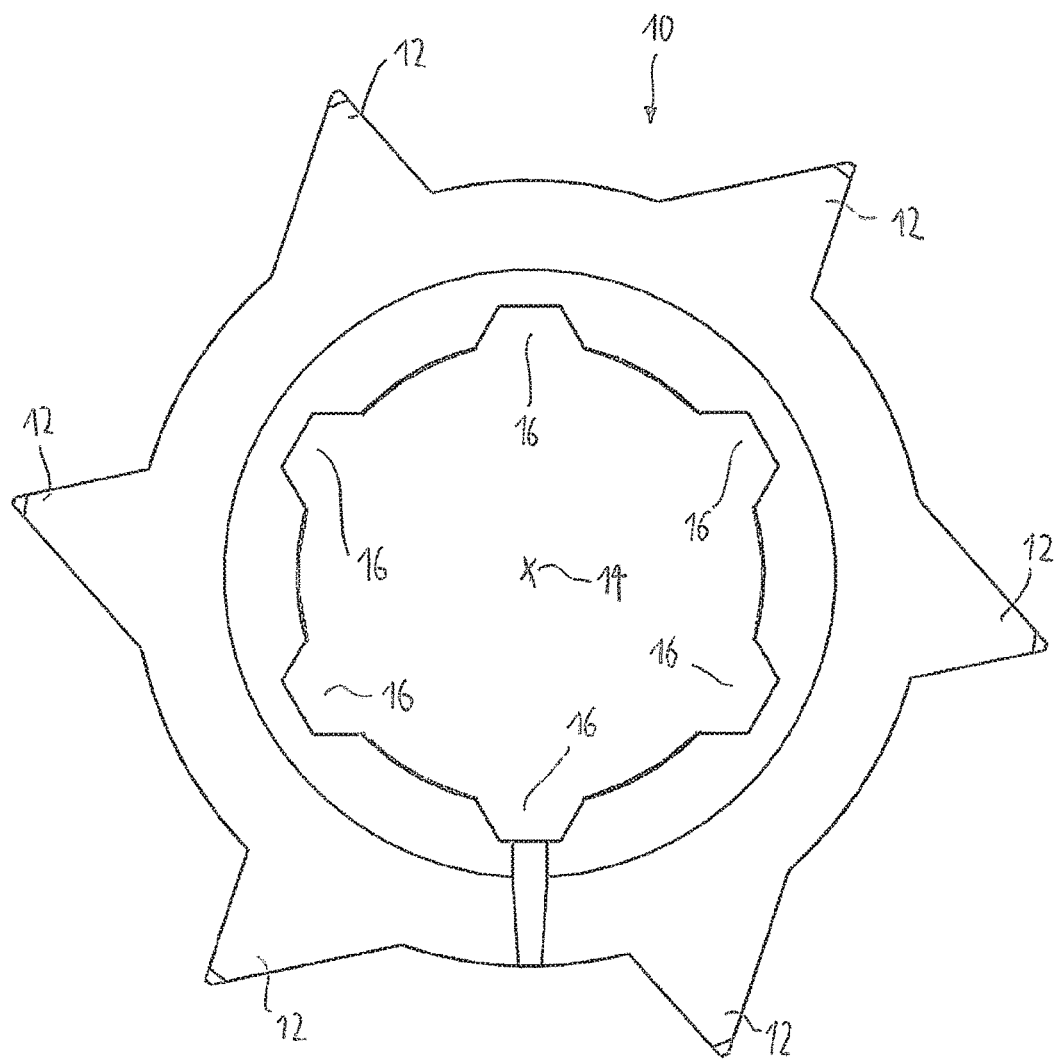
FIG. 2 shows a view of the coil from FIG. 1, seen from above.

FIG. 2 shows a view, seen from above, along the coil axis 14 onto the coil 10 from FIG. 1. The recesses 16 are spaced apart by the length of one coil turn along a strip of material which forms the coil 10 and are aligned along the coil axis 14 direction, as can be seen in FIG. 2. As a result, the coil 10 can receive a drive (not shown) of a driving tool in the direction of the coil axis 14, wherein the drive engages in the recesses 16 and can transmit torque to the coil 10 when turned about the coil axis 14. From FIG. 2, it can be seen that when one drive engages in all six pairs of aligned recesses 16, torsion or a change in the shape of the coil is avoided or at least limited.

Figure 3:
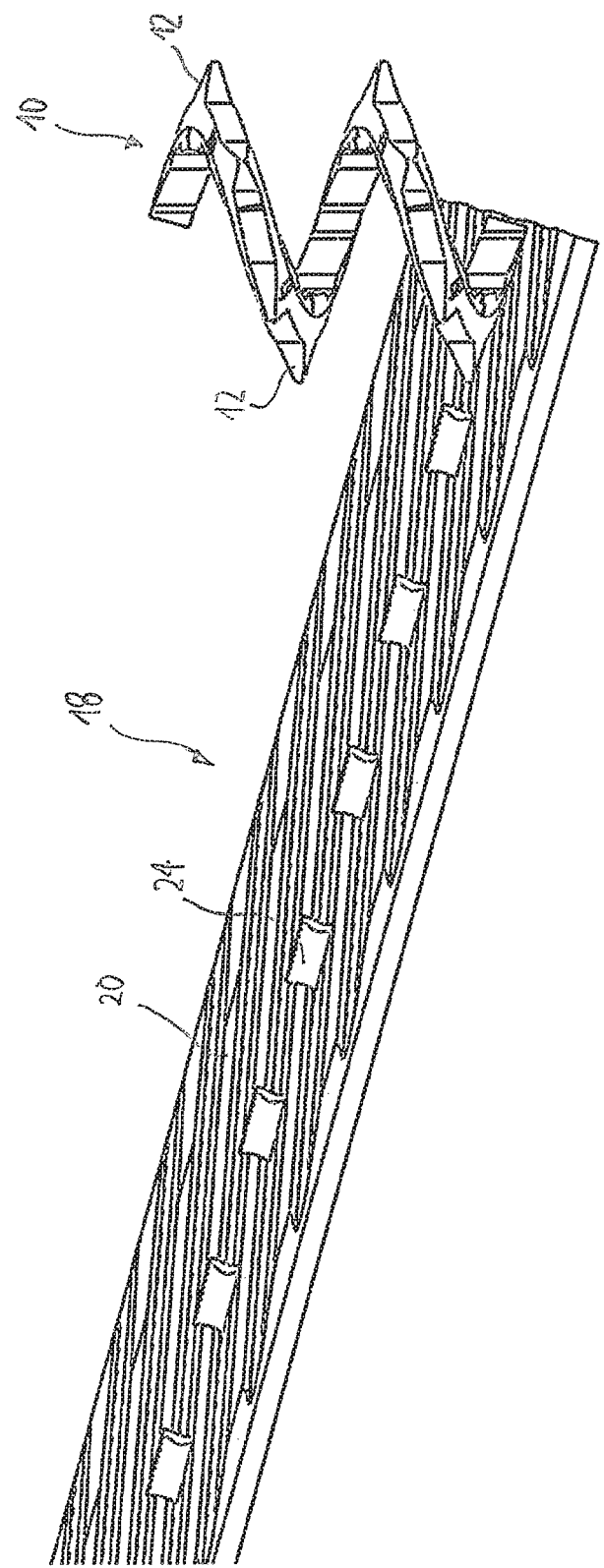
FIG. 3 shows a profiled strip with a preformed internal thread and a portion of the coil from FIG. 1.

FIG. 3 shows a profiled strip 18, which can be wound about the coil 10 from FIGS. 1 and 2 in order to produce a threaded insert. The profiled strip 18 is preformed with the profile 20 of an internal thread on an inner side and the profile 22 (cf. FIG. 4) of an external thread on an opposite outer side. The profiled strip 18 can comprise through-holes 24, at which the profiled strip 18 is pierced by its radially outer projections 12 when the coil 10 is wound up.

Figure 4:
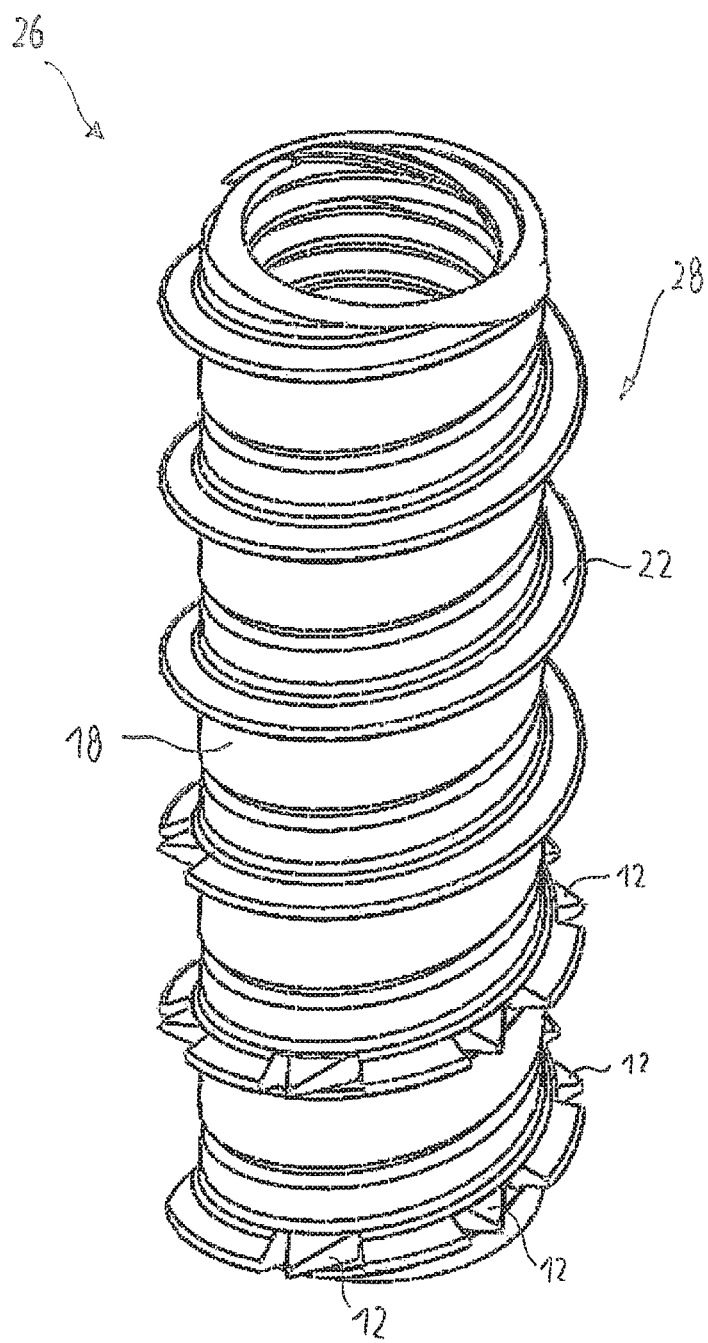
FIG. 4 shows a portion of a threaded insert, which comprises a wound profiled strip and the coil from FIG. 1.

FIG. 4 shows a threaded insert 26, which was produced by winding the profiled strip 18 from FIG. 3 about the coil 10 of FIGS. 1 and 2. It can be seen that the radially outer projections 12 of the coil 10 pierce the profiled strip 18 and form a part of the external thread 28 of the threaded insert 26.

Figure 5:
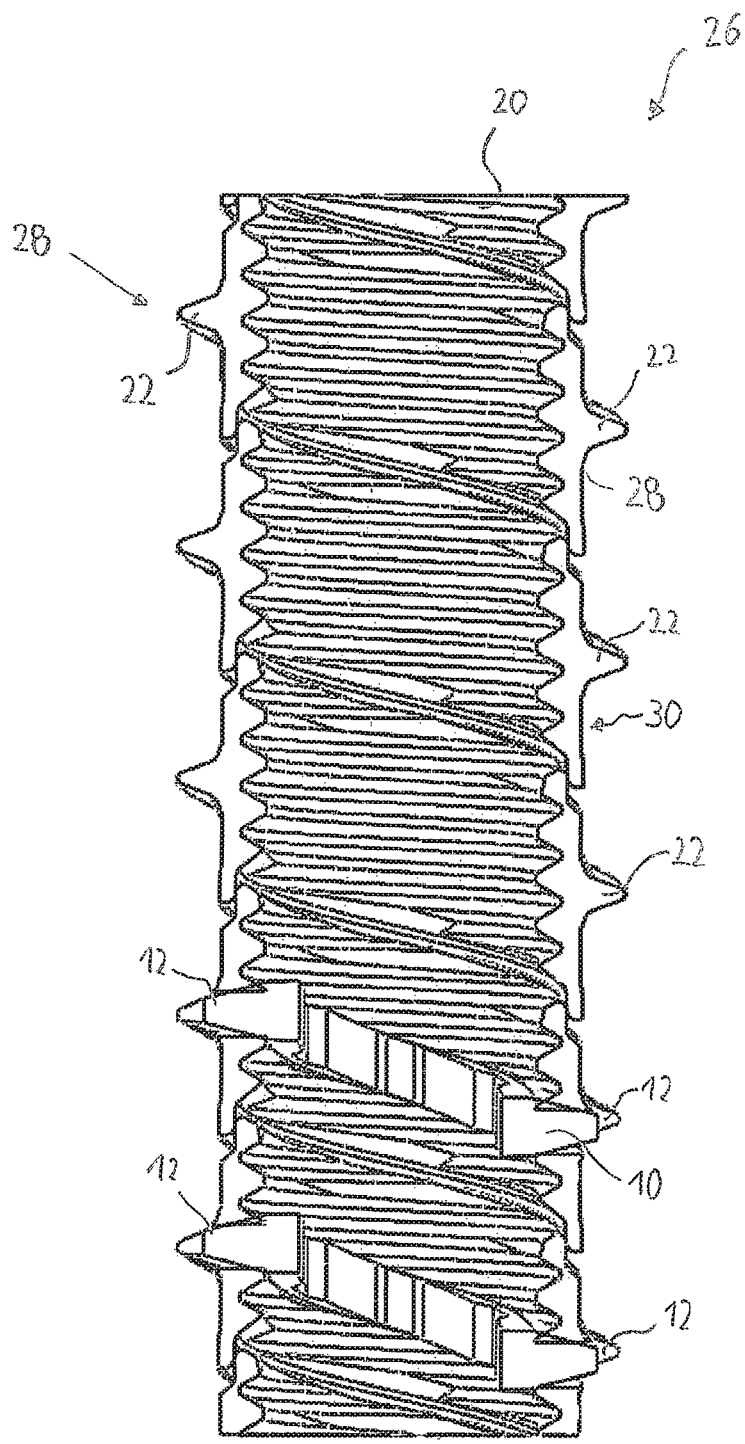
FIG. 5 shows a longitudinal section through the threaded insert from FIG. 4.

FIG. 5 shows a longitudinal section through the threaded insert 26 from FIG. 4, which comprises a threaded insert sleeve 30, which is formed from or continued from the wound profiled strip 18, and which comprises the coil 10. It can be seen that the winding pitch of the profiled strip 18 in FIG. 5 corresponds to the pitch of the coil and that the through-holes 24 are each provided in the region of the profile of the external thread, so that the external thread is formed or continued in this region by the radially outer projections 12. Since the winding pitch corresponds to the pitch of the coil and the radially outer projections 12 pierce the profiled strip in the region of the flank of the outer thread, the torque can be transmitted effectively by the coil 10 to the external thread 28 of the threaded insert sleeve 30.

In the threaded insert 26, the pitch of the external thread 28 corresponds to the winding pitch of the profiled strip, so that the flank of the outer thread runs seamlessly along the external thread 28 and not over a transition at its lateral profiled strip edge resulting because of the winding. In FIG. 5 it can also be seen that the internal thread of the threaded insert sleeve 30 can have a different pitch from the external thread.

Since the coil 10, as shown in FIG. 5, is located at a leading end (at the bottom in FIG. 5) of the threaded insert sleeve 30, when the threaded insert sleeve is introduced into a drilled hole, it is drawn into the drilled hole from the leading end. The internal thread of the threaded insert sleeve 30, which is located towards the rear end of the threaded insert sleeve 30 of the coil 10 (at the top in FIG. 5), can be used for anchoring an anchoring bolt, which can be screwed into that thread portion.

Figure 6:
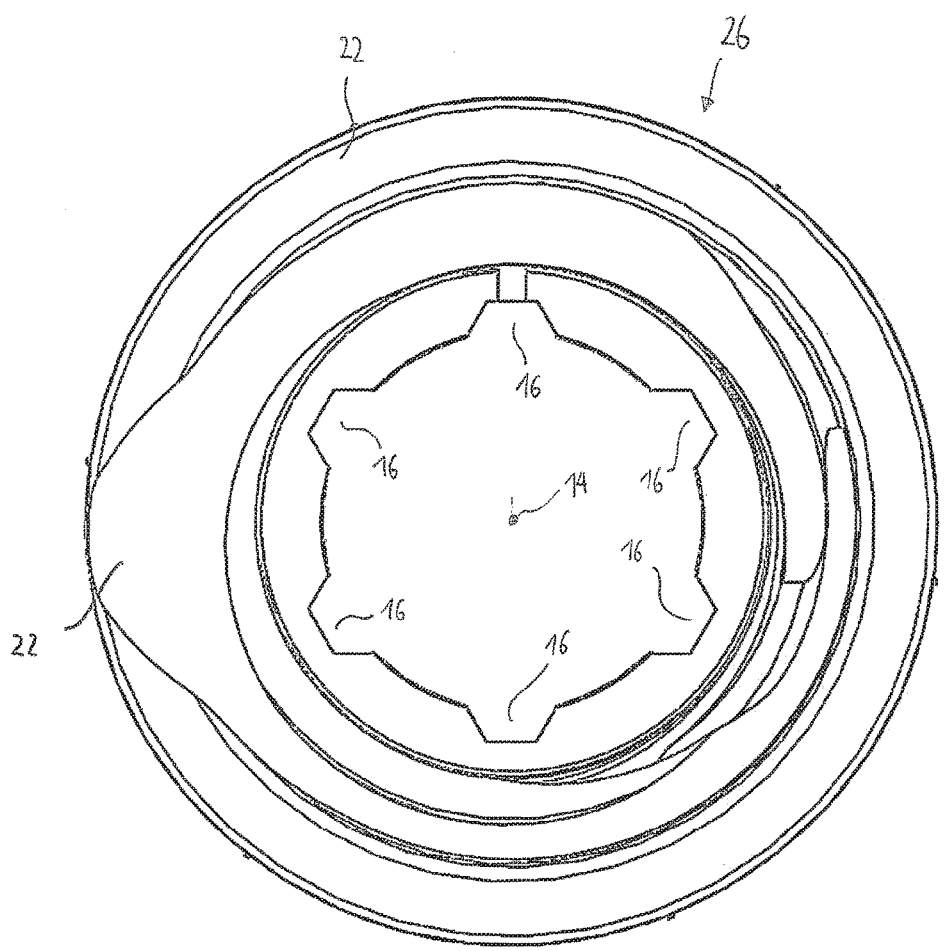
FIG. 6 shows a view of the threaded insert from FIG. 4, seen from above.

FIG. 6 shows a view of the threaded insert 26 of FIGS. 4 and 5 from above, seen in the direction of the coil axis 14.

Figure 7:
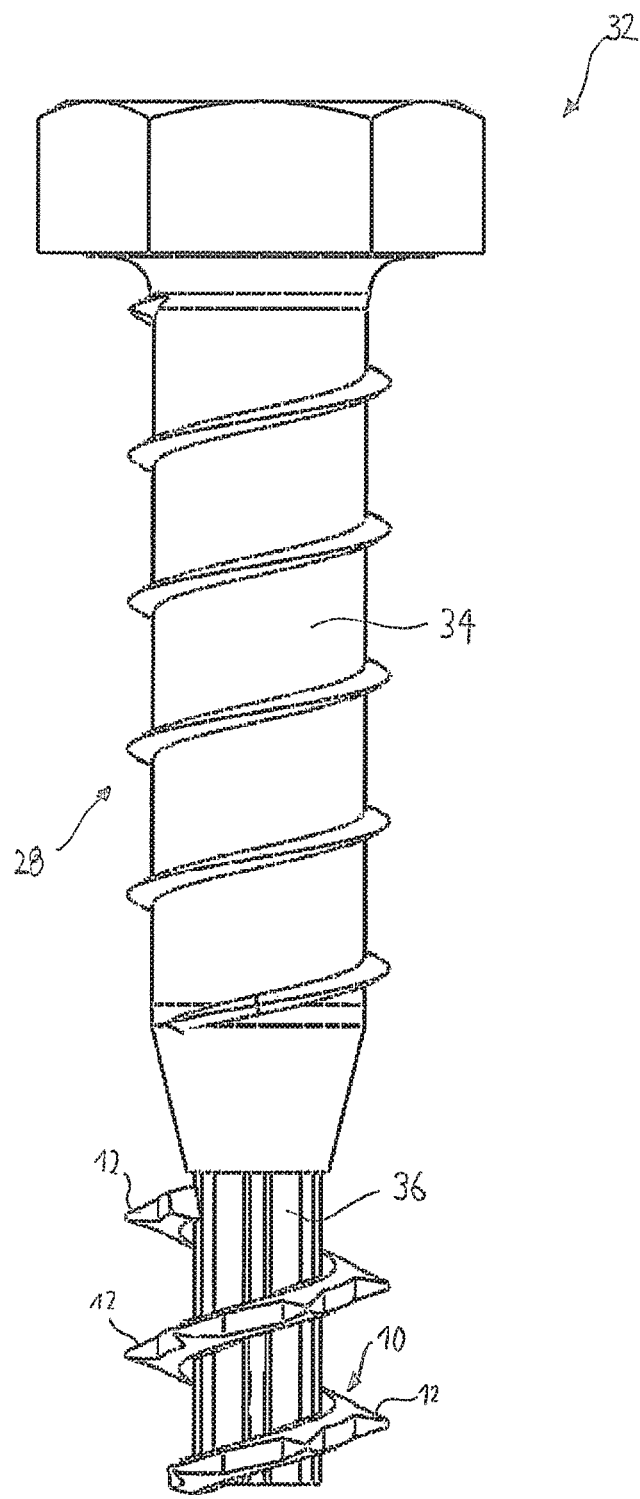
FIG. 7 shows a bolt, which comprises a coil on a drive portion.

FIG. 7 shows a bolt 32 which comprises a thread portion 34 with an external thread 28 and a coil 10 at a drive portion 36. The pitch of the coil 10 corresponds to the pitch of the external thread 28 on the thread portion 34. The radially outer projections 12 of the coil 10 are superimposed with an imaginary periodical continuation of the external thread 28 in the direction of the leading end of the bolt, so that the coil 10 can tap a thread for the following external thread 28 of the bolt 32, which tapped thread offers hardly any resistance to the external thread 28 when the bolt 32 is screwed in, and into which the external thread 28 can engage.

As a result, for that part of the bolt 32 which does not comprise the coil 10, it is possible to use a material which is not suitable for tapping, especially a material which is not hardened and/or corrosion-resistant and which can be anchored in a drilled hole via a thread tapped by the coil 10.

Figure 8:
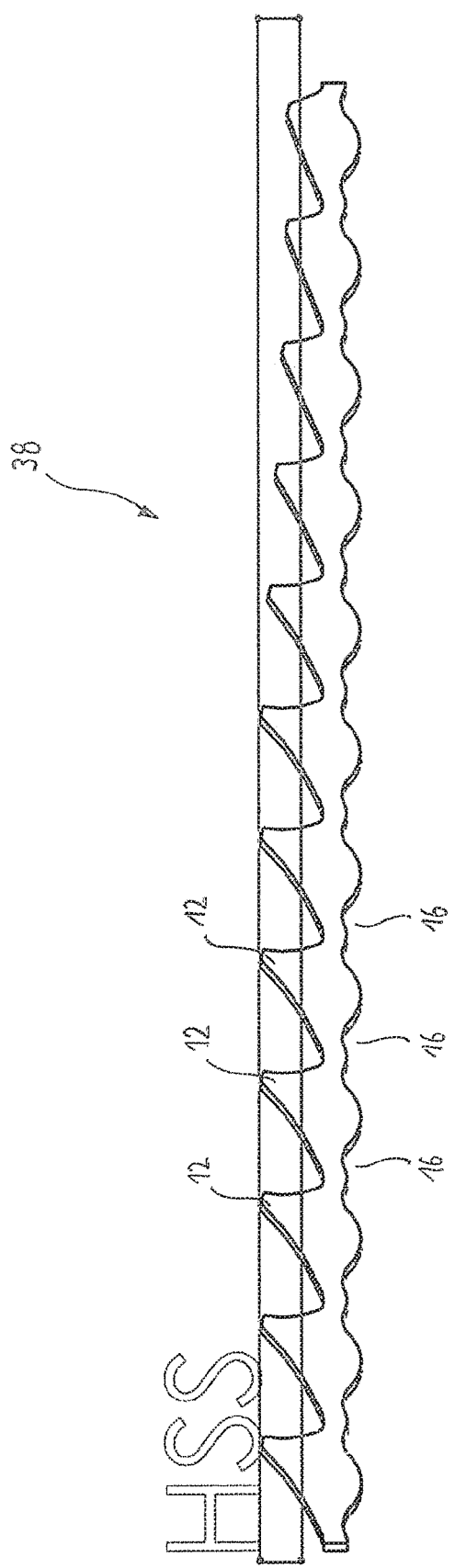
FIG. 8 shows a strip of material from which a coil can be produced, the envelope of which has a diameter that reduces on a leading portion of the coil towards a leading end of the coil.

FIG. 8 shows a strip of material 38, which can be used to produce a coil 10, the strip of material 38 being wound about an imaginary coil axis 14 in order to do so. It can be seen in FIG. 8 that the height of the projections 12 declines in one direction of the strip of material 38. That direction corresponds to the leading end of the coil 10 when the coil 10 is completed, so that the diameter of the envelope of the coil produced from the strip of material 38 declines in the direction of the leading end of the coil. A coil 10 of this kind is easier to place in a drilled hole and simplifies the thread tapping. The region of the strip of material 38 indicated by lines in FIG. 8 is made of high-speed steel (HSS). The remaining part of the strip of material can be made of stainless steel, for example.

A method for producing a coil 10 will now be described in more detail with reference to FIG. 9.

Figure 9:
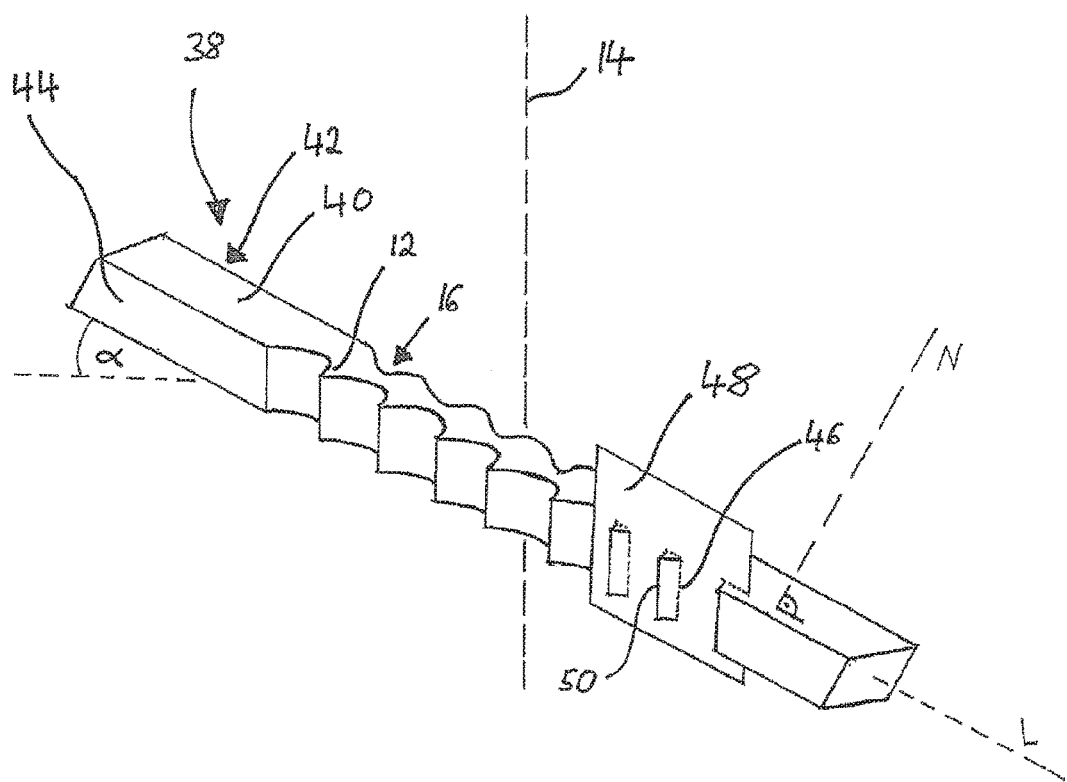
FIG. 9 shows a strip of material for producing a coil, wherein the strip of material has a plurality of projections which are introduced into the strip of material with a rake.

The method comprises providing a strip of material 38, which is shown in FIG. 9. The strip of material 38 extends in a longitudinal direction L and has an upper surface 40 and an opposite lower surface, the surface normal N of the upper surface 40 being at least approximately perpendicular to the longitudinal direction L. The strip of material 38 also has a first lateral surface 42 and an opposite second lateral surface 44, the first lateral surface 42 containing a plurality of recesses 16 and the second lateral surface 44 a plurality of projections 12. The recesses and/or the projections are introduced into the strip of material 38 with the rake of a coil pitch to be wound. The coil pitch to be wound, with which the strip of material 38 is wound about the imaginary coil axis 14, is indicated in FIG. 9 by the angle α, which corresponds to the rake between the coil axis 14 and the surface normal N.

In other words, the imaginary section lines 46 of a section between the first lateral surface 42 and/or the second lateral surface 44 with an imaginary section plane 48 held by the longitudinal direction L and the surface normal N are inclined to the surface normal N with a rake which corresponds at least approximately to the coil pitch α to be wound.

The method further comprises winding into a coil 10 the strip of material pro-vided 38 with the coil pitch α to be wound about an imaginary coil axis 14.

Because of the inclined introduction of the recesses 16, the first lateral surface 42 in the driving profile runs parallel to the coil axis 14 in the longitudinal direction of the coil 10. As a result, a drive can be used for the coil 10 whose drive means run parallel to the longitudinal direction, it being possible for that drive to be received into the driving profile of the coil 10 in the direction of the coil axis 14 in such a way that the drive means rest evenly on the first lateral surface 42 of the strip of material 38 wound into the coil 10. This improves the stabilisation of the coil 10 and the transmission of torque.

Because of the inclined introduction of the projections 12, the second lateral surface 44 runs parallel to the coil axis 14 in the longitudinal direction of the coil 10. As a result, it can be ensured that the radially outer projections 12 extend radially outwards perpendicularly to the coil axis 14, and not inclined towards the latter with the coil pitch α, so that the thread is not tapped at an angle, but perpendicularly to the wall of the drilled hole and evenly over the tapping edges 50, which then run parallel to the coil axis 14.

Differently from what is shown in FIG. 9, the radially outer projections 12 can also run tapered in the radial direction, as is illustrated in FIG. 1, for example. In this case, the radially outer projections 12 do not have tapping edges 50, but cutting tips.

Figure 10:
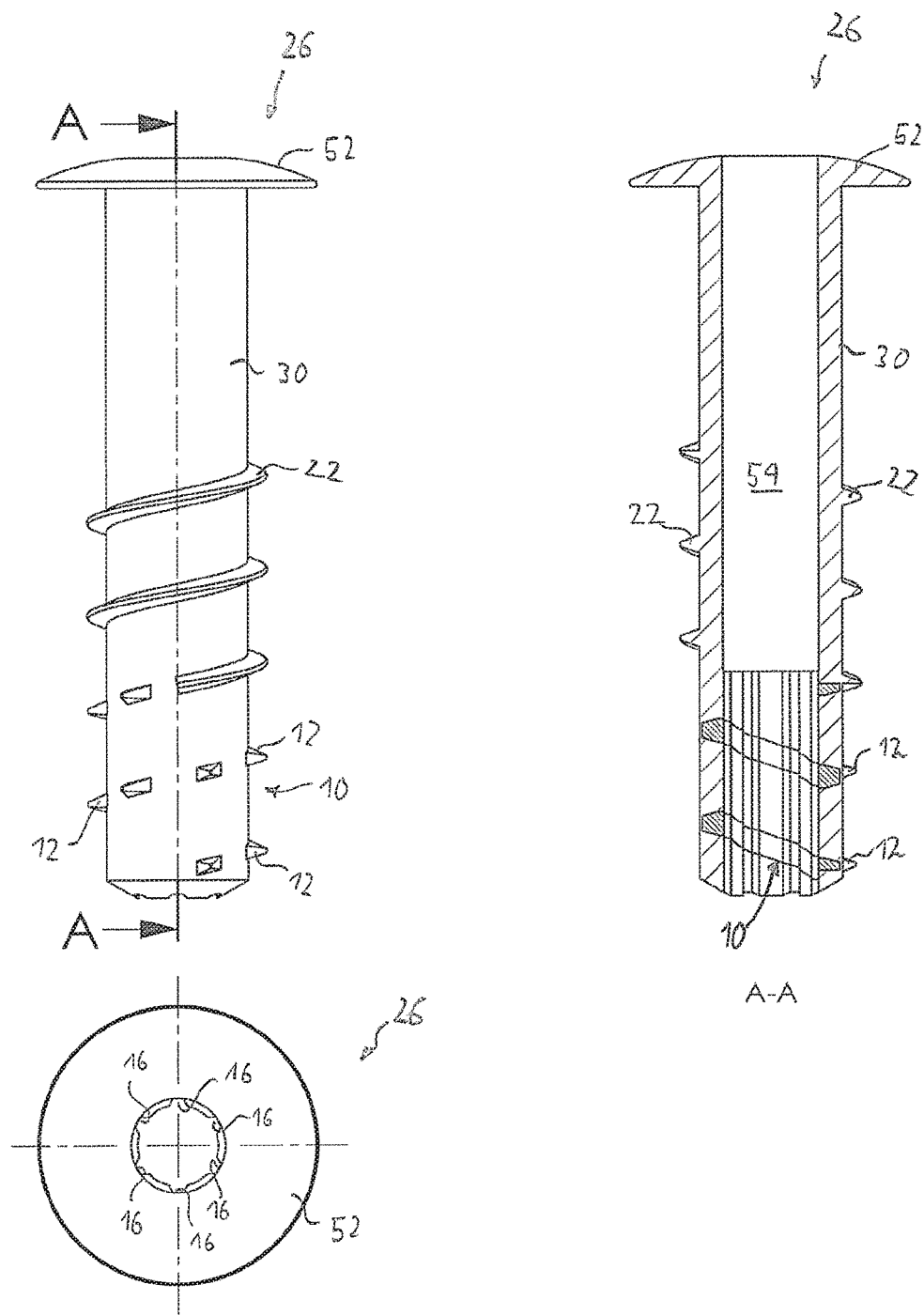
FIG. 10 shows a side view, a longitudinal section and a view seen from above of a threaded insert of plastic.

FIG. 10 shows a side view, a longitudinal section and a view seen from above of a threaded insert 26 in which the threaded insert sleeve 30 is made of plastic. A head portion 52 is located at an upper end of the threaded insert sleeve 30 as shown in the illustration of FIG. 10, i.e. the rear end. A coil 10 of the kind illustrated in FIG. 1 is injected into the plastic sleeve 30 at a lower end as shown in the illustration, i.e. the leading end. The threaded insert sleeve 30 comprises an external thread 22, which is likewise made of plastic and is formed integrally with the sleeve 30. In the example shown, the external thread 22 only runs over part of the length of the threaded insert sleeve 30. The projections 12 of the coil 10 here are located on an imaginary periodical continuation of the thread 22. In an alternative example, the external thread can also run between the tips of the radially outer profile 12 of the coil 10 (not shown) and only be interrupted by the tips of the radially outer profile 12 of the coil 10, similar to the case with the threaded insert 26 of FIGS. 4 and 5. This, too, would be a case in which the profile tips 12 would be located on the "periodical continuation" of the thread 22. In fact, because of the increased load-bearing capacity of the assembly, this would be a preferred variant, but it is not shown, for reasons of the clarity of the depiction in FIGS. 10 to 13.

The threaded insert sleeve 30 has a cavity 54, through which a driving tool (not shown) can be inserted and received in the driving profile of the coil 10, so that the threaded insert 26 can be screwed into a substrate, in the course of which the projections 12 tap a thread. In the view seen from above, in FIG. 10, the recesses 16 can be seen, which form the driving profile of the coil 10.

The threaded insert 26 of FIG. 10 can be used, for example, to fasten on-roof insulation or the like to a substrate, such as a concrete substrate. The plastic sleeve 30 can be produced inexpensively, also in great lengths, for example in lengths of 30 cm, 40 cm, 50 cm or even more. It should be noted that the threaded insert 26 of FIG. 10 is only to be screwed into the associated substrate with its leading portion, namely the portion on which the thread 22 is formed. The term "threaded insert" is therefore intended to be understood broadly in the present disclosure and is not intended to suggest that the "insert" is inserted into the substrate over its entire length.

Figure 11:
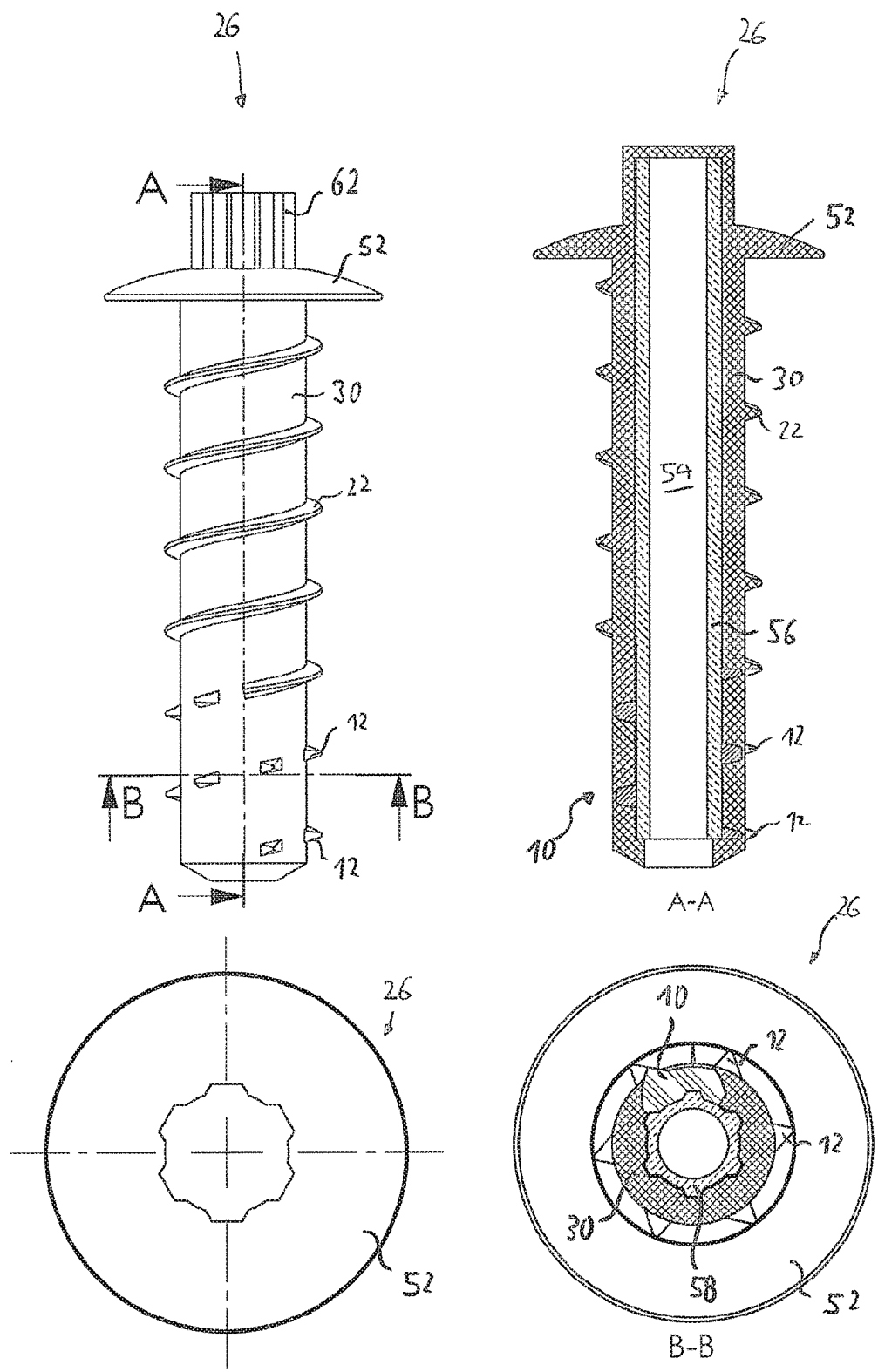
FIG. 11 shows a side view, a longitudinal section, a cross-section and a view seen from above of a further threaded insert of plastic, which has a drive element permanently disposed in a plastic sleeve.

FIG. 11 shows a further threaded insert 26 with a threaded insert sleeve 30 of plastic, at the leading end of which there is again a coil 12 injected in the manner described above. Unlike the example in FIG. 10, however, the plastic sleeve 30 here has an external thread 28, which runs over the entire length of the plastic sleeve 30, and which is continued periodically through the projections 12 of the coil 10, as can be seen in FIG. 11.

A further difference compared to the example of FIG. 10 is that the threaded insert 26 of FIG. 11 has a drive element 56 which is permanently located in the plastic sleeve 30. In a region close to the leading end, the drive element 56 has a first profile 58, which can be seen clearly in the section view B-B. This first profile 58 is in engagement with the driving profile of the coil 10.

In a region close to the rear end, the drive element 56 has a second profile 60, which can be seen clearly in the view seen from above. In terms of its shape in this example, the second profile corresponds to the first profile, though it has a somewhat larger cross-section, because it is encapsulated with plastic. This second profile 60 can be brought into engagement with a driving tool. The threaded insert 26 of FIG. 11 can therefore be screwed in more easily than the one of FIG. 10, because it is only necessary to place a suitable driving tool on the second profile 60 at the top, and not to guide a lengthy tool through the entire cavity 54 of the plastic sleeve 30. The threaded insert 26 of FIG. 11 is also completely closed.

The drive element 56 is hollow, in order to save material and weight. The drive element 56 can be formed from a metallic material, which gives the threaded insert 26 comparatively high tensile strength and at the same time allows the transmission of torque from the second profile 60 to the coil 12 via the first profile 58. Alternatively, however, the drive element can also be made of a reinforced plastic, especially a plastic reinforced with short or long fibres, wherein the fibres may, for example, by formed of carbon fibres or glass fibres. The drive element 56 can, for example, be prepared from a reinforced plastic which is produced by the running meter in an extrusion process and then cut to the appropriate length.

Figure 12:
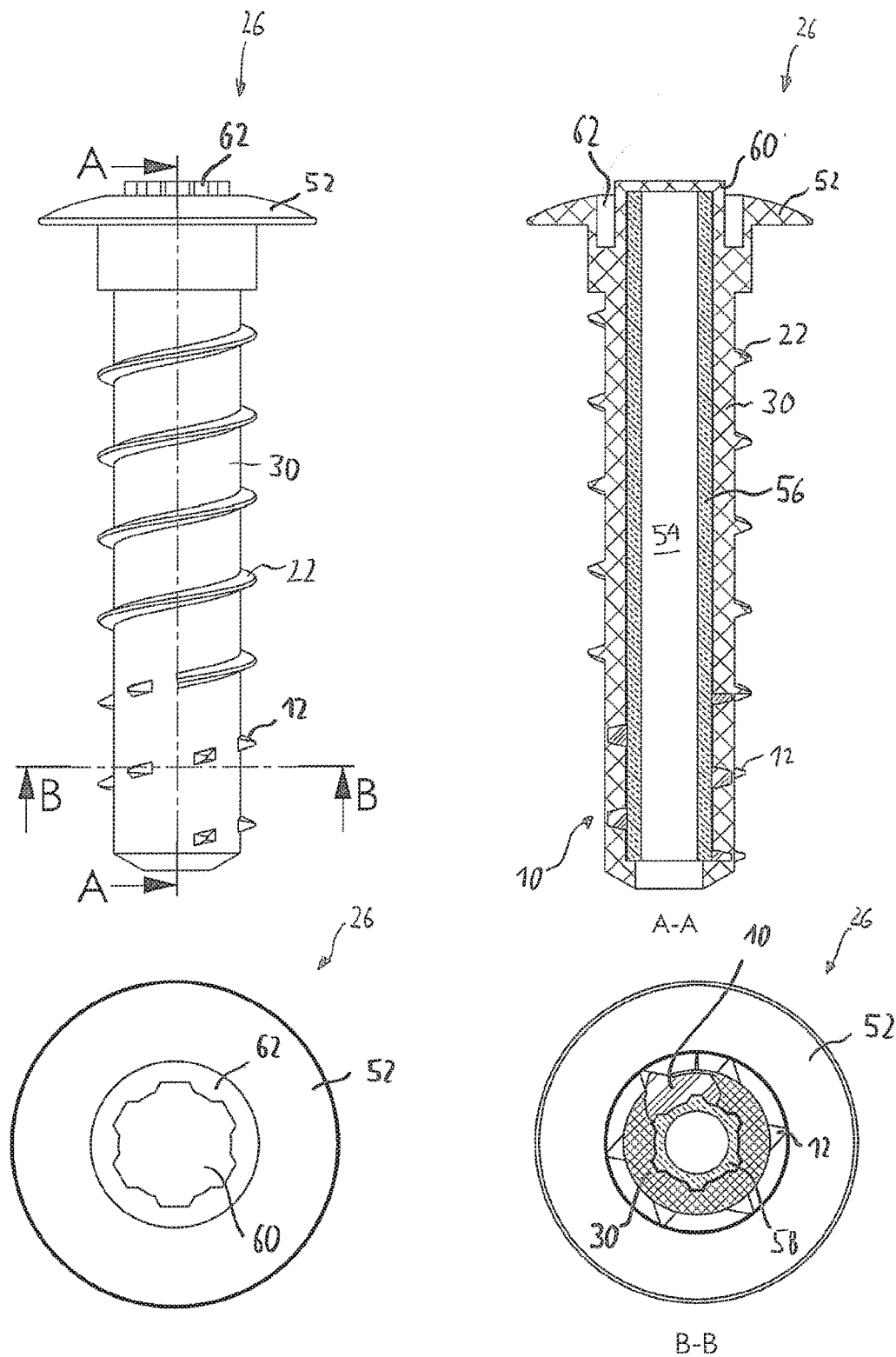
FIG. 12 shows a thread step, which is similar to the threaded insert from FIG. 11, but in which the second profile of the drive element is disposed in a recess in the head portion.

FIG. 12 shows a further threaded insert 26, which is very similar to the threaded insert of FIG. 11 and will not be described again in detail. The greatest difference compared to the threaded insert of FIG. 11 is that the second profile 60 of the drive element 56 projects only slightly above the head portion 52. Instead, the head portion 52 has a recess 62, in which is located the second profile 60 of the drive element 52, as can be seen particularly well in the view seen from above. The recess 62 in this context is big enough to allow the second profile 60 to be brought into engagement with a suitable driving tool (not shown).

Figure 13:
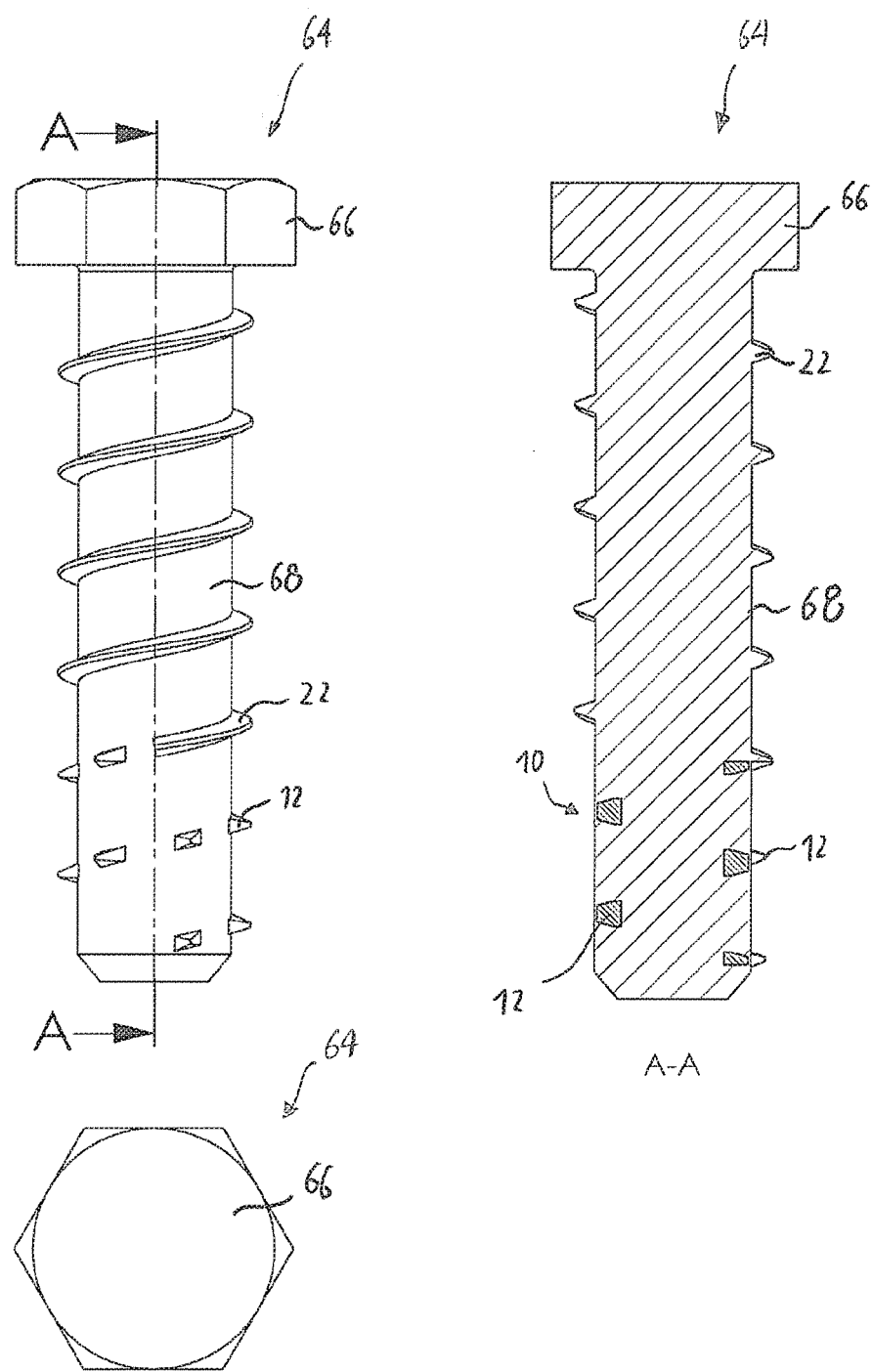
FIG. 13 shows a side view, a longitudinal section and a view seen from above of a plastic bolt into which a coil is injected.

Finally, FIG. 13 shows a bolt 64 with a head 66 configured as a force contact point and a shaft portion 68, on which a thread 22 is formed. The bolt 64 of FIG. 13 is configured as a plastic injection-moulded part, i.e. the head 66, the shaft 68 and the thread 22 consist of plastic. A coil 10 of the kind shown in FIG. 1 is injected at the leading end of the shaft 68, such that the radially outer profile, namely the projections 12, projects radially beyond the shaft portion 68 and is located on an imaginary periodical continuation of the thread 22.

The injected coil 10 can possess all the characteristics of the coil 10 described above, alone or in combination. It is not, however, necessary for the coil 10 to have a driving profile, i.e. recesses 16 (see FIG. 1), since in this case the coil 10 does not need to receive a separate driving tool or drive element. Instead, it is injected completely into the shaft 68, since the shaft is in this case configured to be solid.

The bolt 64 in FIG. 13 has the advantage that it can be produced extremely inexpensively. Furthermore the plastic material is corrosion-resistant. At the same time, the radially outer profile 12 of the coil 10, which periodically continues the thread 22, allows the bolt 64 to be screwed in a self-tapping manner even into hard substrates, such as concrete or brickwork.

It should be noted that the embodiments described are to be regarded as merely exemplary and not as limiting the invention, and that the features described can be important in any combination.

LIST OF REFERENCE NUMERALS

10 Coil
12 Radially outer projections
14 Coil axis
16 Recesses
18 Profiled strip
20 Internal thread profile
22 External thread profile
24 Through-holes
26 Threaded insert
28 External thread
30 Threaded insert sleeve
32 Bolt
34 Thread portion
36 Drive portion
38 Strip of material
40 Upper surface
42 First lateral surface
44 Second lateral surface
α Coil pitch 46 Imaginary section lines
48 Imaginary section plane
50 Tapping edges
52 Head portion
54 Cavity
56 Drive system
58 First profile
60 Second profile
62 Recess
64 Bolt
66 Head
68 Shaft portion

The invention claimed is:

1. A coil for transmitting a torque to a threaded insert sleeve with an external thread and/or for tapping a thread, said coil comprising:
   a radially outer profile, which is provided for anchoring said coil in said threaded insert sleeve for transmitting the torque to said threaded insert sleeve and for tapping the thread, said radially outer profile comprising a plurality of outer projections in the form of tapping teeth arranged spaced apart from one another on an outer side of the coil, and
   a driving profile suitable for receiving a drive, which can engage in said driving profile in such a way that a torque can be transmitted from the drive to said coil and at the same time any torsion of said coil is limited or avoided,
   in which the driving profile comprises a plurality of recesses, wherein at least two recesses are spaced apart from one another along a strip of material by a length of one coil turn, so that said at least two recesses are aligned along a longitudinal axis.

2. The coil as claimed in claim 1, which is formed from the strip of material which runs helically about the longitudinal axis, wherein a length of the said strip of material corresponds to at least the length of one coil turn.

3. The coil as claimed in claim 1, which has at least two coil turns and in which the plurality of recesses comprise a plurality of pairs of recesses, wherein said recesses of each pair are spaced apart from one another along the strip of material by the length of one coil turn, so that the recesses of each pair are aligned along the longitudinal axis.

4. The coil as claimed in claim 1, which is at least partially made from a hardenable metal.

5. The coil as claimed in claim 1, which is at least partially formed from hardened metal which has a hardness of ≥58 HRC, wherein HRC refers to the Rockwell hardness according to ISO 6508-1 (1997).

6. The coil as claimed in claim 1, which is formed from a bimetal and comprises a bent region, wherein
   said bent region and the driving profile are formed at least partially from heat-treatable steel, and
   the radially outer profile is formed at least partially from high-speed steel.

7. The coil as claimed in claim 1, in which a diameter of an envelope of the radially outer profile along a portion of said coil adjacent to a leading end of said coil becomes smaller towards the leading end of said coil, wherein said portion of said coil corresponds to at least a length of half a coil turn.

8. A coil for transmitting a torque to a threaded insert sleeve with an external thread and/or for tapping a thread, said coil comprising:
   a radially outer profile, which is provided for anchoring said coil in said threaded insert sleeve for transmitting the torque to said threaded insert sleeve and for tapping the thread, said radially outer profile comprising a plurality of outer projections in the form of tapping teeth arranged spaced apart from one another on an outer side of the coil, and
   a driving profile suitable for receiving a drive, which can engage in said driving profile in such a way that a torque can be transmitted from the drive to said coil and at the same time any torsion of said coil is limited or avoided,
   in which the driving profile has a shape of a hexalobular socket, a polylobular socket or a polygonal socket.

9. A threaded insert which is suitable for inserting into a drilled hole and comprises:
   a threaded insert sleeve with an external thread, and
   a coil, said coil comprising:
      a radially outer profile, which is provided for anchoring said coil in said threaded insert sleeve for tapping a thread, and
      a driving profile suitable for receiving a drive, which can engage in said driving profile in such a way that a torque can be transmitted from the drive to said coil and at the same time any torsion of said coil is limited or avoided,
   wherein said coil is disposed at least partially in a leading half of said threaded insert sleeve, and is connected to said threaded insert sleeve in a positive fit via its radially outer profile such that a torque transmitted to said coil via the driving profile is transmitted to said threaded insert sleeve.

10. The threaded insert as claimed in claim 9, wherein an anchoring bolt can be anchored in the threaded insert sleeve,
   wherein said threaded insert sleeve has an internal thread into which the anchoring bolt can be screwed.

11. The threaded insert as claimed in claim 9, in which the radially outer profile of the coil pierces the threaded insert sleeve and forms portions of the external thread.

12. The threaded insert as claimed in claim 9, in which the connection between the coil and the threaded insert sleeve is one of a force fit and a cohesive joint.

13. The threaded insert as claimed in claim 9, in which the threaded insert sleeve is formed at least partially from a different material than the coil.

14. The threaded insert as claimed in claim 9, in which the threaded insert sleeve comprises a wound profiled strip, which is preformed on one side with a profile of the external thread and on the other side with a profile of an internal thread.

15. The threaded insert as claimed in claim 9, in which a pitch ($\alpha$) of the coil corresponds at least approximately to a winding pitch of a profiled strip.

16. The threaded insert as claimed in claim 9, in which the threaded insert sleeve has a head portion which projects radially beyond a rest of said threaded insert sleeve.

17. The threaded insert as claimed in claim 16, in which a drive element is permanently disposed in the threaded insert sleeve,
   wherein the drive element has a first profile in a region near a leading end, which is engaged with the driving profile of the coil, and a second profile in a region near a rear end, which can be brought into engagement with a driving tool.

18. The threaded insert as claimed in claim 17, in which the second profile is encapsulated with plastic.

19. The threaded insert as claimed in claim 17, in which the drive element consists at least mainly one of:
- a metallic material, and
- a reinforced plastic, which is reinforced with one of a set of carbon fibres and a set of glass fibres.

20. The threaded insert as claimed in claim 17, wherein said head portion has a recess in which the second profile of the drive element is disposed, and wherein said recess is big enough to allow said second profile to be brought into engagement with the driving tool.

21. The threaded insert as claimed in claim 16, in which a second profile protrudes above the head portion.

22. The threaded insert as claimed in claim 9, in which the threaded insert sleeve comprises a plastic sleeve or is formed by a plastic sleeve.

23. The threaded insert as claimed in claim 22, wherein the coil is encapsulated with plastic.

24. The threaded insert as claimed in claim 9, wherein the threaded insert sleeve is formed at least partly from one of stainless steel and plastic.

\* \* \* \* \*